United States Patent
Merlo et al.

(10) Patent No.: US 11,519,474 B2
(45) Date of Patent: Dec. 6, 2022

(54) METHOD AND DEVICE FOR REAL TIME ESTIMATION OF THE APPLIED PRESSURE AND OF NOISINESS IN A BRAKE ELEMENT, IN PARTICULAR A BRAKE PAD

(71) Applicant: ITT Italia S.r.l., Lainate (IT)

(72) Inventors: Fabrizio Merlo, Barge (IT); Luca Martinotto, Barge (IT); Daniele Donzelli, Barge (IT); Mattia Solari, Barge (IT)

(73) Assignee: ITT Italia S.r.l.

( * ) Notice: Subject to any disclaimer, the term of this patent is extended or adjusted under 35 U.S.C. 154(b) by 1067 days.

(21) Appl. No.: 16/180,556

(22) Filed: Nov. 5, 2018

(65) Prior Publication Data
US 2019/0178322 A1    Jun. 13, 2019

Related U.S. Application Data

(63) Continuation of application No. 14/785,213, filed as application No. PCT/IB2014/060778 on Apr. 16, 2014, now Pat. No. 10,119,586.

(30) Foreign Application Priority Data

Apr. 17, 2013    (IT) .......................... TO2013A000307

(51) Int. Cl.
*F16D 66/00*    (2006.01)
*F16D 65/00*    (2006.01)
(Continued)

(52) U.S. Cl.
CPC .............. *F16D 66/00* (2013.01); *B60T 17/22* (2013.01); *F16D 65/0006* (2013.01);
(Continued)

(58) Field of Classification Search
CPC ...... F16D 66/00; F16D 65/0006; F16D 65/08; F16D 65/092; F16D 66/026; F16D 69/00;
(Continued)

(56) References Cited

U.S. PATENT DOCUMENTS

| 4,602,702 A | 7/1986 | Ohta | ....................... B60T 8/326 |
| | | | 188/106 P |
| 4,623,044 A | * 11/1986 | Ohta | ....................... F16D 65/18 |
| | | | 188/72.1 |

(Continued)

FOREIGN PATENT DOCUMENTS

| CN | 101135554 A | 3/2008 |
| CN | 101144515 A | 3/2008 |

(Continued)

OTHER PUBLICATIONS

International Search Report & Written Opinion for PCT/IB2014/060778; dated Aug. 6, 2014; 10 pages.

(Continued)

*Primary Examiner* — Thomas Ingram
(74) *Attorney, Agent, or Firm* — Barclay Damon LLP

(57) ABSTRACT

A brake element is sensorized by at least one piezoceramic sensor arranged between a metallic support element and a block of friction material of a brake element, the sensor being completely embedded within the block. An electrical voltage signal generated by at least one piezoceramic sensor, without the need for a power supply, is picked up by an electrical circuit integrated into the metallic support element. The electrical voltage signal is processed in the form of equal length of samples per unit of time of the detected signal by successively processing in real time each sample of equal length of time sample of the signal by applying an algorithm. The algorithm is selected from at least one of a sequence of integrations of voltage values in the sample carried out in an interval of time in the order of milliseconds;

(Continued)

FFT voltage data sample; and integral of the voltage data sample.

20 Claims, 7 Drawing Sheets

(51) Int. Cl.
  F16D 66/02 (2006.01)
  F16D 69/00 (2006.01)
  F16D 65/08 (2006.01)
  F16D 65/092 (2006.01)
  G01L 1/16 (2006.01)
  G01L 5/28 (2006.01)
  B60T 17/22 (2006.01)
  G01L 5/22 (2006.01)

(52) U.S. Cl.
  CPC ............ *F16D 65/08* (2013.01); *F16D 65/092* (2013.01); *F16D 66/026* (2013.01); *F16D 69/00* (2013.01); *G01L 1/16* (2013.01); *G01L 5/225* (2013.01); *G01L 5/28* (2013.01); *F16D 2066/001* (2013.01); *F16D 2066/005* (2013.01); *F16D 2069/006* (2013.01); *Y10T 29/42* (2015.01)

(58) Field of Classification Search
  CPC ......... F16D 2066/001; F16D 2066/005; F16D 2069/006; B60T 17/22; G01L 1/16; G01L 5/225; G01L 5/28
  See application file for complete search history.

(56) References Cited

U.S. PATENT DOCUMENTS

| | | | |
|---|---|---|---|
| 5,895,616 A | 4/1999 | Yumoto et al. | |
| 7,124,639 B1 * | 10/2006 | Kurtz | G01L 9/0055 73/753 |
| 9,827,961 B2 * | 11/2017 | Spieker | B60T 8/885 |
| 2005/0251306 A1 * | 11/2005 | Gowan | G01P 1/16 701/71 |
| 2006/0254868 A1 | 11/2006 | Thiesing et al. | |
| 2007/0024113 A1 * | 2/2007 | Thrush | F16D 66/00 303/155 |
| 2008/0246335 A1 * | 10/2008 | Spieker | B60T 8/885 303/122.08 |
| 2009/0133971 A1 | 5/2009 | Baier-Welt | |
| 2009/0157358 A1 * | 6/2009 | Kim | G01M 11/085 702/185 |
| 2009/0296945 A1 | 12/2009 | Attia et al. | |
| 2010/0250081 A1 | 9/2010 | Kinser | B60T 8/00 701/70 |
| 2010/0318258 A1 * | 12/2010 | Katayama | G07C 5/0858 701/31.4 |
| 2013/0013348 A1 * | 1/2013 | Ling | G06Q 40/08 705/4 |
| 2014/0257605 A1 * | 9/2014 | Beck | B60L 3/12 701/19 |
| 2014/0311833 A1 * | 10/2014 | Martinotto | F16D 69/00 29/25.35 |
| 2017/0052028 A1 * | 2/2017 | Choudhury | G01C 21/165 |

FOREIGN PATENT DOCUMENTS

| | | |
|---|---|---|
| CN | 101248341 A | 8/2008 |
| DE | 102005052630 | 3/2007 |
| EP | 1431606 | 6/2004 |
| EP | 1531110 | 5/2005 |
| EP | 1923592 | 5/2008 |
| GB | 2478423 | 9/2011 |
| JP | H09-14315 A | 1/1997 |
| JP | 11094707 | 4/1999 |
| JP | 2006193091 | 7/2006 |

OTHER PUBLICATIONS

Chinese Office Action and Search Report for CN 201480021932.2: dated: Mar. 31, 2017; 7 pages.

* cited by examiner

METHOD AND DEVICE FOR REAL TIME ESTIMATION OF THE APPLIED PRESSURE AND OF NOISINESS IN A BRAKE ELEMENT, IN PARTICULAR A BRAKE PAD

CROSS REFERENCE TO RELATED APPLICATIONS

This application is a continuation application of U.S. application Ser. No. 14/785,213, filed Oct. 16, 2015, which is a national stage application under 35 U.S.C. § 371 of International Application No. PCT/IB2014/060778, filed Apr. 16, 2014, which claims priority of Italian Patent Application No. TO2013A000307, filed Apr. 17, 2013, the entire contents of each application being herein incorporated by reference.

TECHNICAL FIELD

The present invention relates to a method and a device for the real time estimation of the applied pressure and more particularly the distribution of such pressure, together with noisiness present within a brake element, in particular a brake pad, by means of the direct detection of the forces acting upon said brake element when in use during the braking operation of a vehicle.

TECHNICAL BACKGROUND

With the vehicle braking systems currently in production there is no way, other than the use of extremely complex external systems, to detect, when in use on a vehicle, the forces that are exchanged in use between the brake pads (or the brake shoes for vehicles still equipped with drum brakes) and the element to be braked, the disk or drum, which is bound to the wheel.

Normally two brake pads per vehicle disc (and therefore per wheel) are controlled by a mechanical caliper which is actuated by a hydraulic and/or electrical circuit when using the vehicle and that exerts pressure on the pads that is proportional to the force applied to the brake pedal. As pressure (nominal) is exerted by the caliper, the pads are pushed against the disc exerting a force that opposes the rotation of the disc, thus braking the vehicle.

The varying pressure distribution that results during the braking process causes unwanted brake pad movements within the caliper itself thus generating different phenomena known in the field of brake pads as, for example, residual torque, vibration and noisiness.

The presence of imperfections within the braking system for example, due in most cases to the wear of the mechanical parts employed (in particular the disc, caliper and brake pads), lead to contact between the surfaces designed to perform the braking which over time is non-homogeneous. Above all, as a result of heavy braking, it may occur that contact remains between the pads and the disc even after the foot is lifted away from the brake pedal, thus resulting in the phenomenon called "residual torque". Residual torque can also be generated by the formation of lobes on the disc, which may already be present when first mounted or that form as a result of excessive disc overheating.

With respect to noisiness, this can be generated at different frequencies within the range of 0.1 and 20,000 Hz.

It is not currently possible to detect the pressure distribution other than in a static manner using pressure-sensitive paper or else by means of systems that are directly interfaced with computers, such as for example the Tekscan I-Scan® pressure mapping system (http://www.tekscan.com/brake-pad-pressure-distribution).

Neither is it possible to detect the type of noisiness, if not with complex equipment such as microphones and accelerometers positioned as necessary within the braking system; whether the braking system is mounted on a chassis dynamometer or else on the vehicle.

This means that, with respect to issues arising from the non perfect functioning of the brake caliper rather than the pad or disc, current vehicle braking systems are "blind".

EP1531110 and GB2478423, which describe vehicle braking systems wherein piezoelectric sensors are arranged, respectively, on the brake disc or between the piston and backplate of the brake calipers (the "backplate" is the metallic support element of the friction material of the brake pad that constitutes the carrier element) for the purpose to, respectively, produce a signal that is employed by an electric motor to adjust the position of the brake caliper piston or else to detect any signs of wheel locking during braking, do not solve this problem.

EP1431606B1 describes a method for the measurement of forces applied to a layer of friction material wherein a functional layer, whose electrical resistance varies as a function of the forces applied to it, is associated with said layer of friction material; the variation in the electrical resistance of the functional layer is then measured and is in proportion to the magnitude of the applied forces.

EP1923592B1 instead describes a brake or friction element having a friction layer and a support plate with at least one capacitive sensor arranged between the friction layer and the support plate, the capacitance of which varies as a function of the force applied to said friction layer.

US2006/0254868 describes a system similar to that of EP1431606B1, wherein the variation in the electrical resistance of a brake element layer of friction material, such as a brake pad, is measured directly.

Even the systems described in EP 1431606B1, EP1923592B1 and US2006/0254868 do not solve the above mentioned technical problem, since they are based on the electrical capacity or electrical resistance variation of a sensor or of an entire functional layer, that allow with relative precision for only static, or very slow, detection of the forces applied to the brake pad, but that are not capable of detecting rapid force variations such as those that occur during braking.

Moreover, these systems need to be continuously supplied electrically, which entails drawbacks, such as the relative amount of energy consumed and the considerable constructive complications associated with ensuring the supply of electrical power between parts that are in relative rapid motion.

DISCLOSURE OF INVENTION

The purpose of the present invention is to provide a method and a device for the real time determination of the applied pressure and noisiness present within a brake element, in particular a brake pad, in a simple and economic manner, detecting in real time the presence and/or the magnitude of the stresses at the interface between the brake element (pad or shoe) and the element being braked (disc or drum brake) during braking.

It is also a preferred purpose of the invention to allow for the continuous measurement of the distribution of the contact pressures acting upon the element being braked and the coefficient of friction between the brake element and the element being braked, for example, between the brake pad and the disc.

The invention therefore relates to a method for the real time determination of the applied pressure and noisiness present in a brake element, in particular a brake pad. The invention also relates to a device designed to perform the above method.

Here and below it is to be understood that the term "real time" means that the sequence of results provided by the system (detection and processing of desired parameters such as applied pressure, the presence of noisiness and the friction coefficient) is fast enough to allow the braking system to be acted upon while the phenomena that generate said measured parameters are still running.

The solution according to the invention involves the insertion between the support element of the block of friction material of the brake element, in particular defined by the backplate of a brake pad, and the block of friction material itself, of sensors defined by piezoceramic elements in an suitable configuration, for example, distributed in a discrete manner and preferably according to a symmetrical matrix, over the whole extension of the interface between the support element and the block of friction material, so as to allow in use for the timely detection of the pressure applied and the distribution of such pressure. The piezoceramic components (sensors), that transduce the mechanical energy into electrical energy, are capable of generating an electrical signal, a voltage for example, without the need for electrical power, and of transmitting said signal to the caliper that controls the brake pads rather than to the electronic control unit of the vehicle that controls the dynamics of the vehicle and of the caliper itself. The information is then post-processed by means of appropriate algorithms in order to obtain the final desired information such as the pressure distribution and its relative pressure centre together with a definition of the type of noisiness, the presence of residual torque and the friction coefficient value.

For example, using a brake pad with integrated piezoceramic sensors, when such a pad is connected to a suitable data processing system, it is possible to determine the type of vibration and/or noisiness present, without the use of additional microphones and/or accelerometers.

According to the invention, this is achieved through the processing of the electrical signal by means of a Fast Fourier Transform (FFT) and/or by integrating the detected voltage values present in samples of equal lengths of time of the voltage signals generated by the sensors within one unit of time.

Surprisingly, the signal obtained by means of the real-time processing of the FFT of the electrical signal generated by each piezoceramic sensor, corresponds to the frequency of the noisiness that can be detected, on the bench or by means of instrumentation on board of the vehicle. Among the types of noisiness that can be detected it is possible to identify for example the "squeal" and the "creep-groan", together with vibrations that are produced not only by the brake system but also by the vehicle suspension system or bench test process itself. It should be noted that, according to a meaning generally attributed to these terms by technical experts in the field, "squeal" is a noisiness caused by vibrations induced by forces of friction, in which the brake disc vibration modes are coupled to those of the brake pad friction material shoes themselves; "creep groan" is a high-intensity, low-frequency noisiness generated by the vibrations that affect road vehicles at very low speeds.

It is also possible to determine which sensor, and hence the brake pad position, that generates noisiness, in order for example, to be able to effectively evaluate by means of bench tests the effect that chamfers/cuts have on the brake pad and/or any relief that might be implemented in order to obtain an anti-noise effect.

With respect to residual torque, it is possible to determine its magnitude by integrating the voltage data in real time, in particular by integrating the equal length of time signal samples coming from the sensors.

Similarly, by employing at least one piezoelectric sensor that is capable of detecting shear forces, using the values obtained from the resulting rough voltage data and/or from the integral of the signal itself, the friction coefficient may then be determined by means of the known relationship:

$$\mu = FT/FN \qquad (1)$$

where $\mu$ is the target friction coefficient, FT is the tangential force acting at the interface between the brake pad and the element being braked (in this case tangentially to the brake disc) and FN is the force normal to the brake disc.

Given that the piezoelectric sensor signal is also proportional to the pressure exerted and the rigidity of the system, then using an appropriate mathematical relationship, to be explained later, it is possible to employ the piezoelectric sensors as indirect wear detectors.

BRIEF DESCRIPTION OF THE DRAWINGS

Further characteristics and advantages of the present invention will become clear from the following description of an exemplary non-limiting embodiment given purely by way of example and with reference to the figures within the accompanying drawings, wherein.

PREFERRED EMBODIMENT OF THE INVENTION

Figure 1:
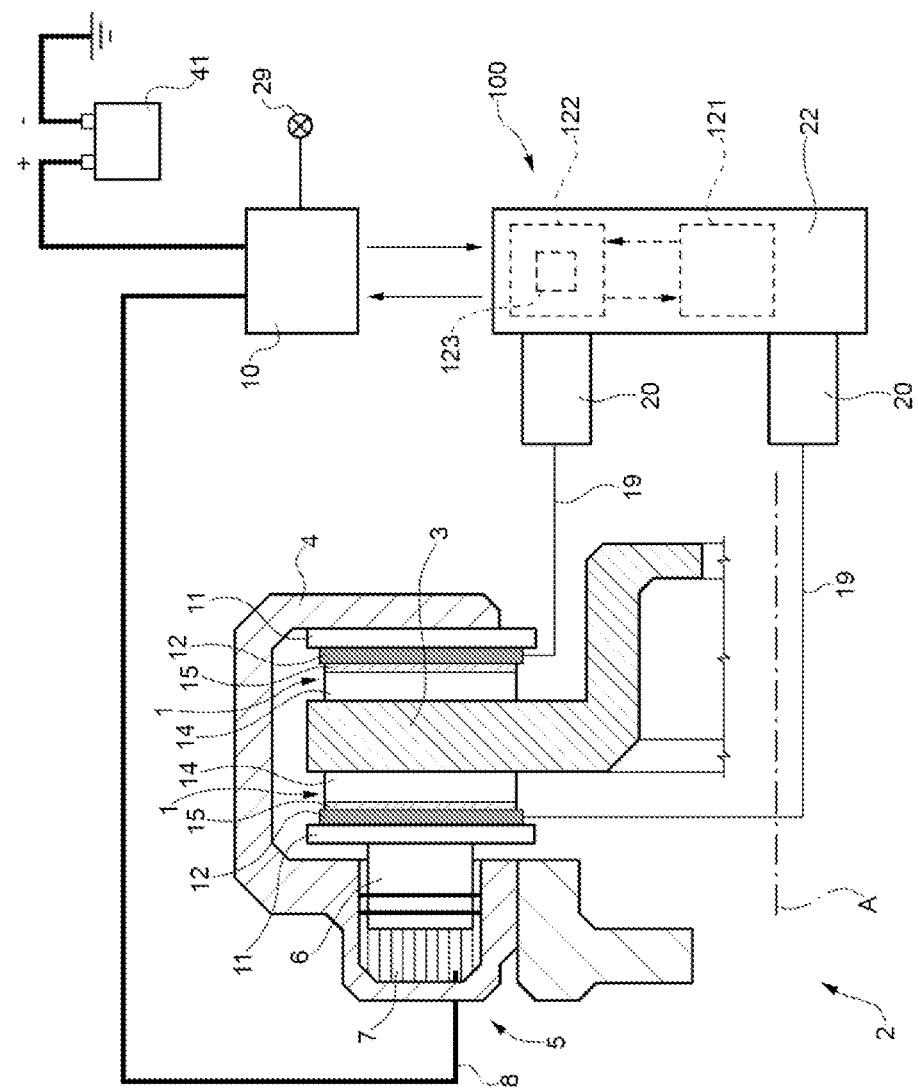
FIG. 1 is a schematic view in elevation and partially according to a longitudinal sectional view taken along the wheel axle of a vehicle braking system equipped with a device according to the invention.
Figure 2:
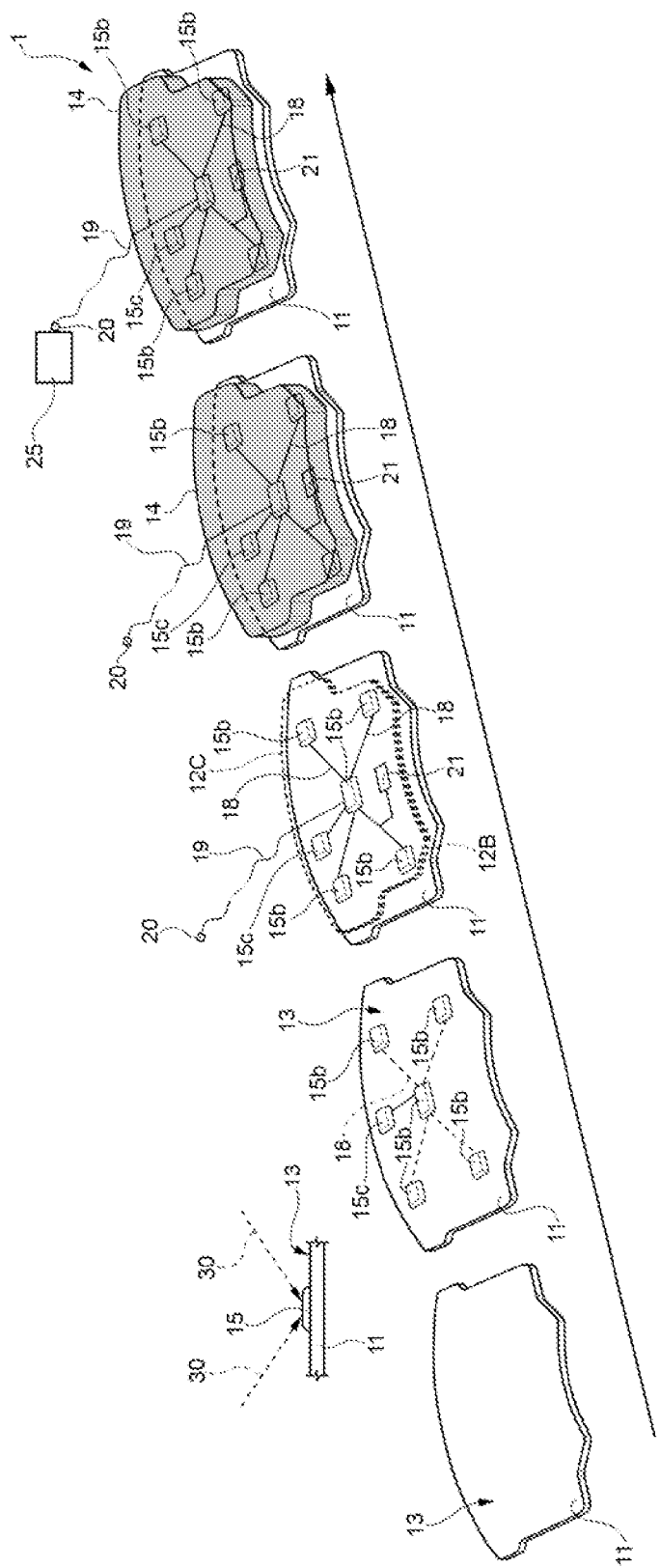
FIG. 2 illustrates schematically an exploded perspective view and in accordance with its construction sequence, a brake element, in this case a brake pad, which constitutes an essential element of the device in FIG. 1 according to the invention.
Figure 6:
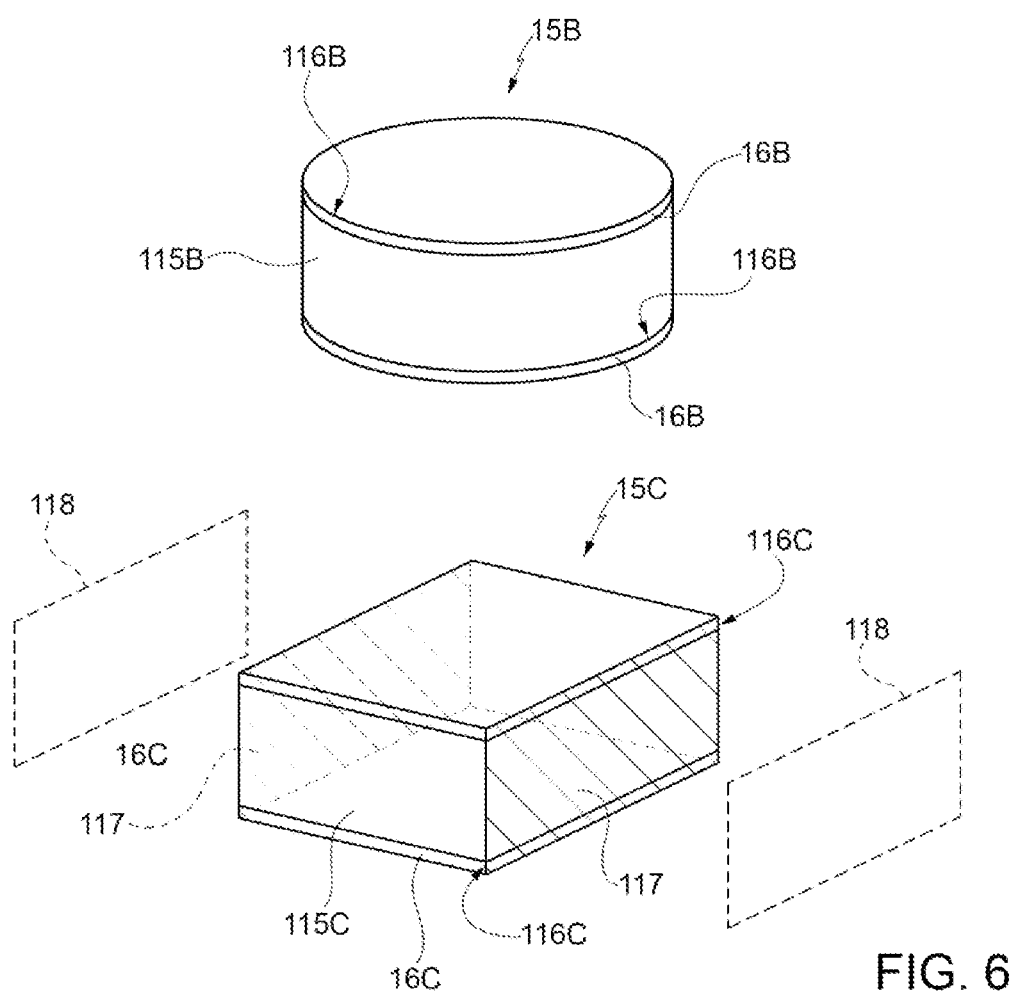
FIG. 6 illustrates schematically and on an enlarged scale, a detail of the brake element components of FIG. 2.

With reference to FIGS. 1, 2 and 6, a sensorized vehicle brake element is depicted, wholly indicated by reference number 1 and more specifically, a brake pad in the example illustrated, which is intended to equip a braking system 2 (FIG. 1), provided with a disc 3 (disc brake system); a disc 3 is attached as known in the art to each wheel of the vehicle (not shown for simplicity) and therefore rotates around a wheel axis A.

The braking system 2 includes, in addition to disc 3 (and therefore for each wheel of the vehicle) and per each disc 3, a brake caliper 4 equipped with an actuator 5, known in the art, and a pair of brake pads 1 carried by the brake caliper 4 together with the actuator 5, pads 1 that in use can be pressed against disc 3 by means of the actuator 5 in order to brake the rotation of disc 3 and with it the wheel to which it is attached and, as a result, the vehicle equipped with the braking system 2.

Here and below the term "in use" means that the brake element is in an operational condition, for example mounted within a braking system carried by a vehicle or else by a test bench, regardless of whether the braking system is activated or not and that, therefore, the braking system presses the brake element against the element to be braked.

The actuator 5 which is illustrated in a non-limiting embodiment is of the hydraulic type, equipped with a piston 6 that slides within an oil filled chamber 7 that is pressurized by means of a pipe 8 when a user presses the vehicle's brake pedal, and that more generally, is controlled by a vehicle control unit 10. Obviously, the actuator 5 may also be of the electrical type in which case it will be directly controlled by the on-board control unit 10. It is also clear that the content described hereinafter also applies to combined hydraulic-electric systems.

Both here and below specific reference will be made to a brake element consisting of a brake pad 1, but it is clear that what will be said is also identically applicable to the brake shoe of a drum brake, so that the braking system 2 described above can also be of a mixed type consisting of two discs 3 only (for example for the front wheels of the vehicle) and two brake drums (known in the art and not shown for simplicity) for the rear wheels, that in use operate with brake elements consisting of brake shoes rather than with brake pads 1.

With further reference to FIG. 2, the brake elements 1 form part of a device for determining in real-time onboard the vehicle the applied pressure, and noisiness generated within each brake element 1, which device is represented as a whole in FIG. 1 by the reference number 100.

For this purpose the brake elements 1 are designed as shown schematically in FIG. 2, wherein a brake element 1 is illustrated in exploded configuration in order to highlight its production process, which will be discussed thereafter.

Consequently, according to one aspect of the invention, brake elements 1 include, besides a metallic support element 11, a heat insulating and damping layer 12C, known as an "underlayer", and a block 14 of friction material, all known in the art, at least one piezoceramic sensor 15, indicated schematically in FIG. 1 as an additional layer only which is sandwiched between the block 14 of friction material and the metallic support element 11.

In particular, the damping and heat insulating layer 12C is positioned above a first surface 13 of the metallic support element 11 which in use is intended to be facing an element to be braked, in the case illustrated the disc 3, of a vehicle, and the block 14 of friction material is held rigid by the metallic support element 11 on the side of the surface 13 and above the damping/insulating layer or underlayer 12C.

In the case of brake pads, as in the non-limiting embodiment illustrated, the element 11, otherwise known as a "backplate", is shaped like a flat plate with a shaped contour. It is to be understood that in the case of a brake shoe there will be elements corresponding to those described herein for the brake pad 1 for which, for those skilled in the art, the following description is easily transferable such that sensorized brake shoes can also be constructed.

As it shall be seen, the at least one sensor 15 allows for the detection of the contact forces between the pads 1 and the disc 3 when in use. In fact, the at least one piezoceramic sensor 15 converts received mechanical energy, in the form for example of force or pressure, into electrical energy without the need of a power supply. When constrained to vary its thickness in the direction of said force, it consequently generates a potential difference, i.e., an electrical voltage signal or electric charge which varies according to the magnitude of the applied force.

In the preferred non-limiting embodiment illustrated, each brake pad 1 comprises not only one sensor 15, but a plurality of piezoceramic sensors 15, which are directly integrated with the surface 13 and that are spaced apart, preferably arranged according to a symmetrical array; further, sensors 15 can be individually activated.

The piezoceramic sensors 15 employed according to the invention differ from known piezoceramic accelerometers in that they are without seismic mass, being formed of the active element only. Moreover, according to the invention, the sensors 15 employed must be designed to have a signal response in the acoustic field from 20 Hz to 20,000 Hz, and to this end feature a response time (the interval between subjecting the sensor to mechanical stress and the subsequent generation by the sensor of the electrical signal) equal to 25 microseconds or less. In order to obtain optimal signal accuracy, it is preferred that the piezoceramic sensors be chosen in such a way as to present a response time, as defined above, equal to or less than 0.16 microseconds.

The at least one piezoceramic sensor 15, or the plurality of sensors 15 is/are arranged between the block 14 of friction material and the metallic support element 11 of the brake element 1, completely embedded within the block 14 of friction material and directly rigidly supported by the metallic support element 11, upon the surface 13 of the metallic support element 11 which is covered by the block 14 of friction material that in use faces the element to be braked 3.

In particular, the at least one sensor/plurality of sensors 15 is/are integrated directly onto the surface 13 of the metallic support element 11 before constructing the brake pad 1 in its entirety and therefore before forming, using techniques known in the art, the heat insulating and damping layer 12C and the block 14 of friction material. Also, before forming the heat insulating/damping layer 12C, an additional continuous or discontinuous electrically insulating layer 12B (FIG. 2) within which the at least one sensor 15/plurality of sensors 15 remain/s completely encased without the creation of any air bubbles, is implemented upon surface 13.

Upon the electrically insulating layer 12B, in a manner known in the art, the layer 12C and the block 14 of friction material are then constructed in such a way as to completely cover the sensor(s) 15 arranged on the surface 13, such that the block 14 becomes integral in one piece with the backplate 11, and in such a way that the at least one sensor 15/plurality of sensors 15 remain/s embedded within the block 14 of friction material with the interposition of the damping and heat insulating layer 12C, directly incorporated within the latter, with the only interposition of the relative electrically insulating layer 12B. When there is only one sensor 15 it may occupy only a limited position/portion of the surface 13, or else it can be implemented in the form of a ceramic film that covers all or only a part the surface 13.

For simplicity, layers 12B and 12C are schematically illustrated in FIG. 1 in the form of a single layer, indicated by the number 12.

In a preferred embodiment, the plurality of piezoceramic sensors 15 consists of pressure sensors which are spaced apart so as to occupy the entire surface 13, but only in a discrete manner, i.e., in correspondence to predetermined points/limited portions of the same.

The sensors 15 can be chosen from among commercial types provided that they are of a thickness, measured perpendicularly to the surface 13, equal to or less than that of the damping layer or underlayer 12C and are attached to the surface 13 by gluing for example or else by other techniques known in the art.

Alternatively, the sensors 15 can be formed directly in situ onto the support element or backplate 11, thus integrating them directly with the surface 13, integrally binding them to said surface 13, e.g. by sintering, as schematically illustrated in FIG. 2, for example by means of a laser beam 30. As regards the material used to integrate the piezoceramic sensors 15, a "soft" or "hard" type of PZT (lead zirconate titanate) compound can be used for example or else a bismuth sodium titanate compound or modified lead metaniobate. The list of possible materials provided herein is not exhaustive and any piezoceramic material currently known in the art or that may be available in the future and that meets the above requirements may be used in the present invention.

The brake pad 1 also includes an electrical circuit 18 shown in FIG. 2 only in a schematic way and without any relation to reality.

With reference to FIG. 6 each piezoceramic sensor 15 comprises a piezoceramic block 115 made of a piezoceramic material having a Curie temperature greater than 200° C., provided with a couple of electrical connections formed by electrodes 16 of opposing polarities, which are provided onto opposite faces of the piezoceramic block 115 and that are connected in any suitable manner, not shown in detail for simplicity, to the electrical circuit 18, which is integrated with the metallic support element 11 of the brake element 1.

In the preferred embodiment illustrated, between the block 14 of friction material and the metallic support element 11 of each brake pad/brake element 1, a plurality of first piezoceramic sensors 15b arranged such that they are spaced apart in order to discreetly occupy all of the first surface 13 of the metallic support element 11 which is covered by the block 14 of friction material and at least a second piezoceramic sensor 15c arranged among the first piezoceramic sensors 15b, are arranged upon the surface 13 and completely embedded within the block 14 of friction material.

One of the sensors 15b is schematically illustrated in FIG. 6. The sensors 15b have a flattened cylindrical shape and are formed by a cylindrical block of piezoceramic material 115b and by two electrodes 16b which entirely cover the respective base faces 116b of the block 115b. Conversely, the sensor 15c, also schematically illustrated in FIG. 6, has a flattened parallelepiped shape and consists of a parallepiped block of piezoceramic material 115c and of two electric signal connections defined by electrodes 16c which entirely cover respective base faces 116c of the block 115c.

Piezoceramic sensors are not of course made of materials having piezoelectric properties, but only of materials which, thanks to their crystalline structure take on piezoelectric properties after appropriate polarization process.

The sensors 15b are thus polarized in a direction perpendicular to the surface 13 and to the respective faces 116b which are provided with the electrodes 16b; whereas the at least one piezoceramic sensor 15c is polarized in a direction parallel to the surface 13 and to the respective faces 116c having the electrodes 16c, in particular, perpendicularly to respective faces 117 illustrated in FIG. 6 by dashed lines, which faces, during the sensor 15c production process, are coated with polarization electrodes 118 (schematically illustrated, by dashed lines in exploded view, in FIG. 6), which are then removed.

In this way, the first piezoceramic sensors 15b are designed to generate a voltage signal in response to the application of stress parallel to the direction in use of the pressure applied to the brake element 1, while the at least one second piezoceramic sensor 15c is designed to generate a voltage signal in response to the application of stress transverse to the direction in use of the pressure applied to the brake element 1, in particular tangentially to the disc 3 and the relative axis of rotation A.

The electrical circuit 18 is connected to an electrical connector 20, in the non-limiting example illustrated by means of a cable 19, which can however be omitted by directly making the connector 20 an integral part of the metallic support element 11. The connector 20 and the electrical circuit 18 are constructed in such a way as to be not only designed to receive and transmit the electrical signals generated and transmitted in use by the sensor/sensors 15, but also to be connected to a voltage generator 25 (FIG. 2), for example at the end of the pad 1 manufacturing process for the purpose of biasing and/or re-polarizing the sensor(s) 15, which, otherwise, could remain inert or not fully functioning.

The device 100 according to the invention also comprises a processing means 22 which is for example connected in a detachable way to the electrical circuit 18 and to the at least one piezoceramic sensor 15 (to the plurality of sensors 15b and 15c) by means of the connector 20 and the optional electrical cable 19 of each brake pad 1. The processing means 22 may also be integrated into the connector 20 and will in any case be connected to the control unit 10 that controls the actuators 5 which, in use, are intended to push the block 14 of friction material of each brake element 1 against the brake element defined by the disc 3 (or by a drum brake in the case of drum brakes).

According to a further aspect of the invention, the brake pad 1 also includes, in addition to a single piezoceramic sensor 15 or a plurality of piezoceramic sensors 15b and 15c, a temperature sensor 21 of any known type, which is also integrated into the backplate 11 in a similar way to the sensors 15 and that is electrically connected to the electrical circuit 18, and that in use also transmits electrical signals (e.g. a voltage) to the connector 20.

The electrical circuit 18 and the connector 20 (together with the optional cable 19) are made in order to provide the processing means 22 with separate signals for each sensor 15 and 21.

Each brake element 1 according to the invention comprises, therefore, in addition to the components already described:

means, represented by the connector 20 (and the optional cable 19) to pick-up from the at least one piezoceramic sensor 15/from the sensors 15b, 15c (and the sensor 21 when present) and by means of the circuit 18, a respective electrical voltage signal generated by the sensor/s, without the need for a separate power supply, in response to the application to each sensor 15/15b, 15c of a mechanical stress resulting from contact between the brake element 1 and the element to be braked 3;

first means 121, represented by a block drawn with dashed lines in FIG. 1, for the real time processing of the electric voltage signal generated by the at least one piezoceramic sensor 15/by the sensors 15b, 15c in order to generate equal length of time samples of said signal, in other words, segmenting the signal into sequences taken at constant intervals of time;

second means 122, also represented by a block drawn with dashed lines in FIG. 1, for processing in real time each of the equal length of time samples of the signal generated by at least one piezoceramic sensor 15/by the sensors 15b, 15c by applying an appropriate algorithm to said equal length of time samples of the signal.

According to an aspect of the invention, this algorithm is selected from a group consisting of: a sequence of integrations of the voltage values present within the equal length of time samples of the signal, each integration being carried out in an interval of time in the order of milliseconds; FFT (Fast Fourier Transform) of the voltages in the sample of equal length of time of the signal; integral of the voltages in the samples of equal length of time of the signal; any combination thereof.

The processing means 121 and 122 may be integrated into the processing means 22, as schematically illustrated in FIG. 1, or else implemented separately or as an integral part, in the form of hardware or software, of the control unit 10.

The device 100 according to the invention, in addition to the processing means 22 which is integrated, or linked to, the processing means 121 and 122, and the sensor 15/sensors 15b, 15c incorporated into each brake element 1, also comprises signalling means 29 that can be activated by the processing means 22 or by the control unit 10 in response to an electrical signal processed by the processing means 121 and 122, as it will be seen below.

By means of the device 100 described, and in particular thanks to the suitably sensorized brake elements 1 as already described, according to the invention there can be implemented, both on the vehicle during its normal use, and therefore during all vehicle braking phases, and during braking system 2 bench tests, a method for the real time estimation of the applied pressure and noisiness present in a brake element, such as the brake element 1 (in this case the brake pad) a method which is illustrated within the experimental diagrams of FIGS. 3, 4, 7 and 8, diagrams that were obtained from bench tests carried out on brake pad 1 prototypes equipped with multiple sensors 15b together with a single sensor 15c as described earlier, and which involves the steps listed below.

A first step of the method of the invention involves having at least one piezoceramic sensor 15 or 15b, 15c between the block 14 of friction material and the metallic support element 11 of the brake element 1, that is completely embedded within the block 14 of friction material and integrally supported directly by the metallic support element 11, upon the surface 13 of the brake element 1 which is covered by the block 14 of friction material and which in use faces towards the element to be braked 3, as previously described in detail.

A second step of the method of the invention involves picking up from the at least one piezoceramic sensor 15/from sensors 15b, 15c, by means of the circuit 18 and with the brake element 1 in use, and therefore with the element to be braked 3 in rotation around axis A, a respective electrical signal, in the example illustrated a voltage ST, whose trend over time is illustrated in the upper part of FIGS. 3, 4, 7, 8. The ST signal is generated by the sensor 15/sensors 15b, 15c, without the need for a power supply, in response to the application of a mechanical stress on the sensors 15 resulting from contact between the brake element 1 and the element to be braked 3.

In the illustrated example, the sensorized brake pad 1 employed in the experiments that generated the graphs of FIGS. 3, 4, 7, 8 was equipped with four sensors 15b (the signal of channels A, C, D and E) and one sensor 15c (the signal of channel B). The graphs illustrated in FIGS. 4, 7 and 8, each relate to complete braking events, the braking event in the graph of FIG. 4 was carried out in an abrupt fashion, as evidenced by the initial peaks in the ST signal; the braking operation for the graphs in FIGS. 7 and 8 were instead carried out gradually. The final peaks in the ST signal in FIGS. 4, 7 and 8 correspond to the end of the braking operation and therefore the detachment of the brake element 1 from the element being braked 3.

Figure 4:
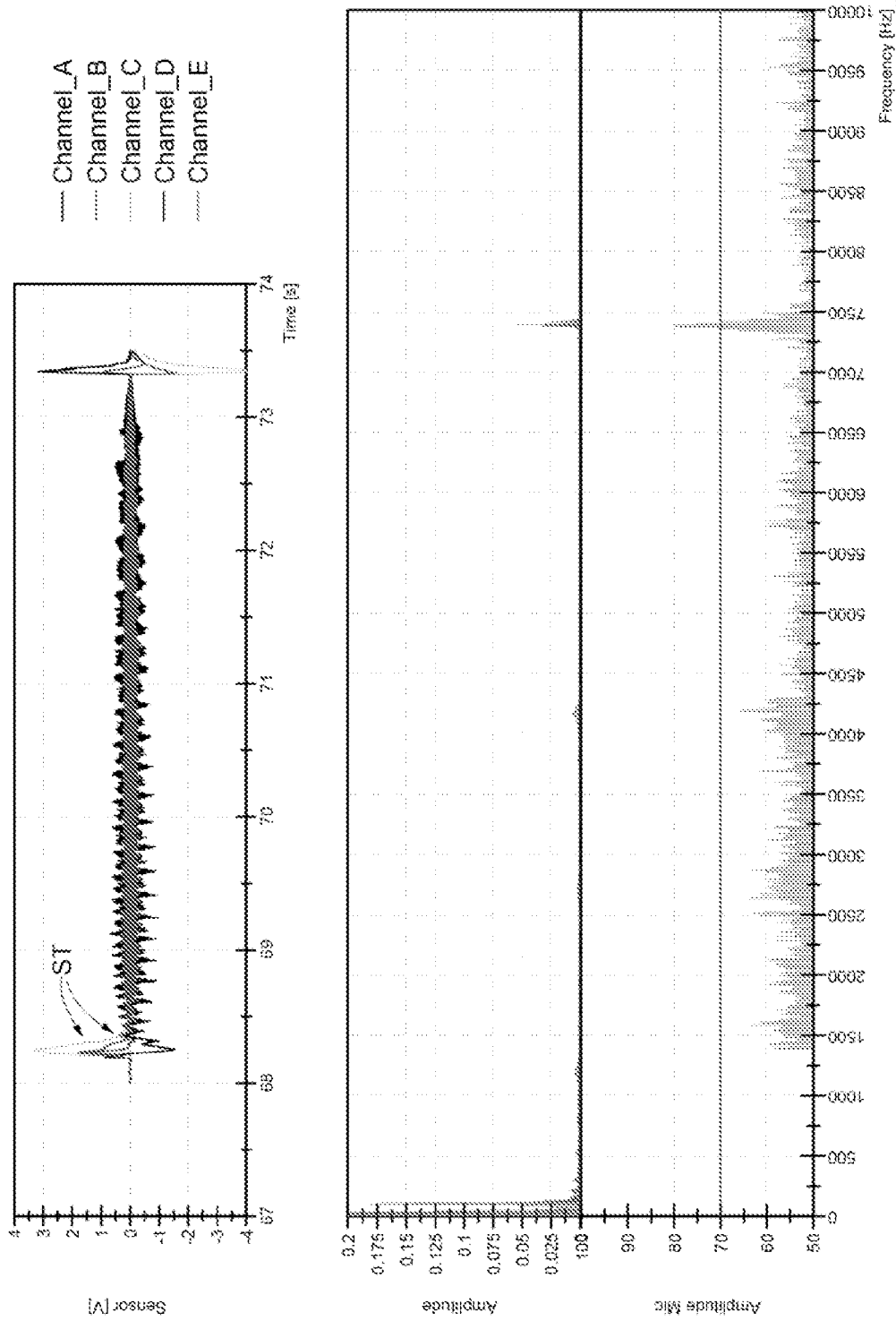

It should be noted that a simple examination of these graphs (and therefore the mere understanding of the raw data) reveals for example that the first brake pad used during the braking operation in FIG. 4 presents an abnormal contact at the sensor 15b related to channel D, which is highlighted by the negative voltage peak. This information alone, produced for example during the bench testing of a new brake pad, would allow for the design revision of said brake pad and/or its support (caliper) in order to avoid this problem when subsequently in use on a vehicle. Or else where obtained from a vehicle in use, this information could be passed to the control unit 10, which could for example operate in a suitable manner one or more of the actuators 5 located on the brake caliper.

Figure 3:
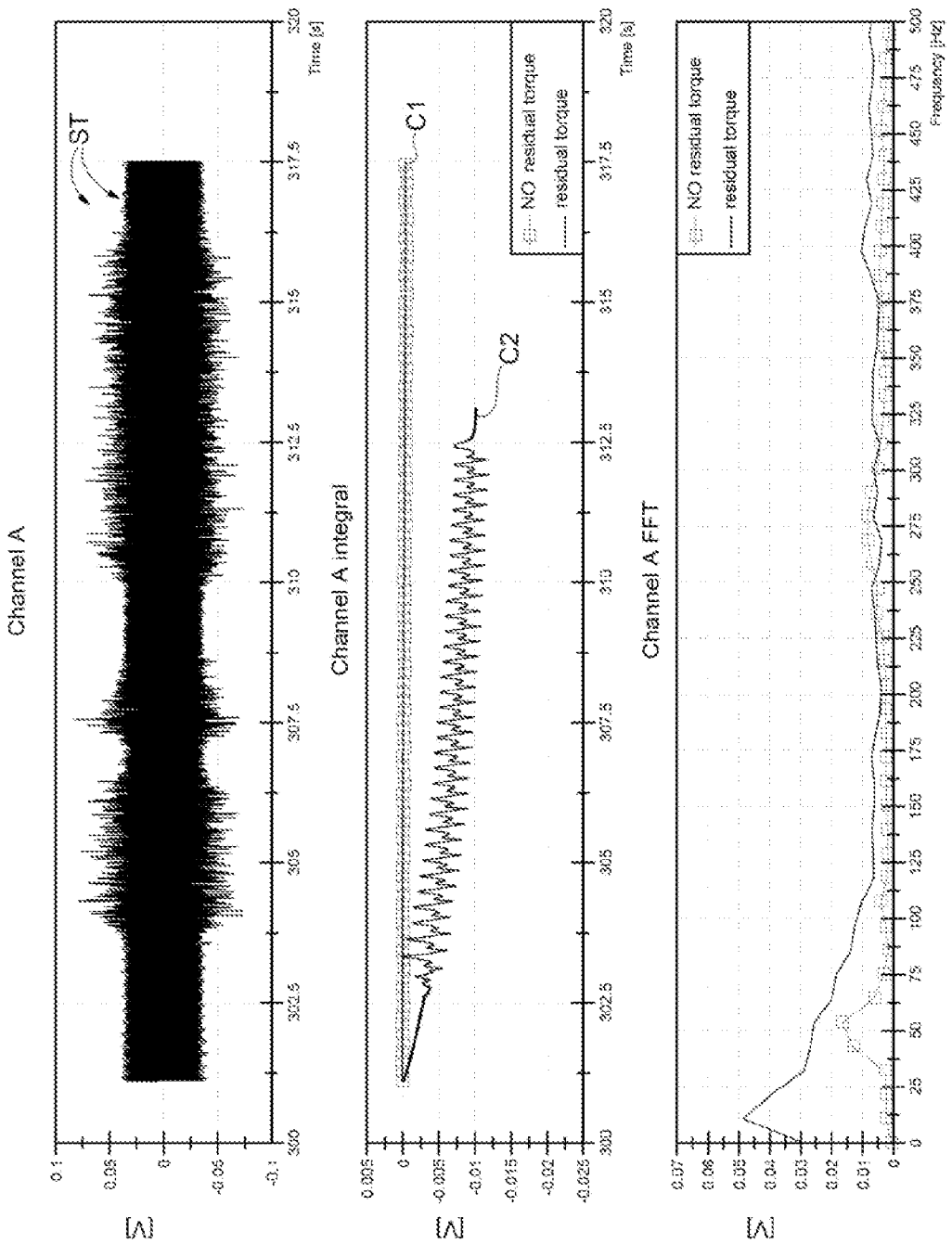
FIGS. 3, 4, 7 and 8 illustrate respective comparative diagrams of the signals that are detected and processed in accordance with the method of the invention using the device illustrated in FIGS. 1 and 2.

The graph of FIG. 3 (upper section) relates to the ST signal produced by a single sensor 15b (related to channel A) under different brake pad 1 operating conditions, as shown in the legend in the lower part of the same FIG. 3, namely when pad 1 is not in contact with the disc 3 and when pad 1 approaches the disc 3.

A third step of the method of the invention involves the real time processing of the electrical voltage signal ST generated by the piezoceramic sensor 15/sensors 15b, 15c so that equal length of time samples are taken of the signal itself, for example for each second of braking, which sample is represented by all of the points of the curves that represent the ST signal within the unit of time under consideration. In the discussed embodiment, a plurality of equal length of time samples of the signal ST is generated by the means 121 throughout the duration of a braking operation (a few seconds).

According to an aspect of the invention, said signal sampling, carried out in this case by the processing means 121, must involve a large number of points, that is of ST signal voltage values which are variable in time. In particular, this step is performed in order to collect a plurality of digital values of the ST signal using a sampling frequency equal to or greater than twice of one highest target frequency contained within said ST signal; in order to optimally detect frequencies in the acoustic field a sampling frequency of at least 40 kHz is used (i.e. equal to or greater than 40 kHz), and preferably equal to 50 kHz. In other words, this means that each group of digital values representing an equal length of time sample in which the ST signal processed by the processing means 121 is subdivided is composed of (i.e. contains) at least 40,000 values of the ST signal per second and preferably 50,000 values of the ST signal per second, which signal, as is evident from the graphs of FIGS. 3, 4, 7, 8, is an oscillating signal, with voltage values that pass from positive to negative, due to the unavoidable vibrations that are generated between the brake element 1 and the element being braked 3 during braking. The above values for the ST signal sampling rate (sampling frequency) are, as will be seen, critical according to the invention for analyzing the noisiness associated with the brake pad 1 during braking.

A fourth step of the method of the invention involves finally the further processing, again in real time, of each equal length of time sample of the voltage signal ST generated by the sensors 15, 15b, 15c by the application using means 122 of an appropriate algorithm applied to each equal length of time sample of the signal processed by means 121.

According to the invention, this algorithm is to be selected from a group consisting of:

a sequence of integration of the voltage values contained within each equal length of time sample of the signal ST of the plurality of equal length of time samples under consideration, each integration representing a "Microintegration" of the ST signal and being processed within a interval of time in the order of milliseconds;

an FFT (Fast Fourier Transform) of each equal length of time ST signal sample generated by each sensor 15, 15b, 15c and applied to the entirety of each equal length of time ST signal sample;

the comprehensive integral of the voltage values for each entire equal length of time ST signal sample generated by each sensor 15, 15b, 15c, and any combination thereof.

The result of the application of these algorithms to the oscillating ST voltage signal generated by each piezoceramic sensor 15 is shown in FIGS. 3, 4, 7, 8.

In particular, the central part of FIG. 3 shows by way of example the graph resulting from the "Microintegration" of two of the ST signals shown in the upper part of the same figure. As is evident, the result is a series of curves C1-Cn; curve C1 corresponds to the rest state of the brake pad 1 (no braking, the pad is not touching), curve C2 corresponds instead to the presence of residual torque due to the fact that the brake pad 1 is in contact with the disc 3 but with no braking pressure being applied.

Conversely, the graph in the lower part of FIG. 3 corresponds to the application to the ST signals of the upper part of the same figure of an FFT and illustrates also in this case the presence of any residual torque generated.

Figure 7:
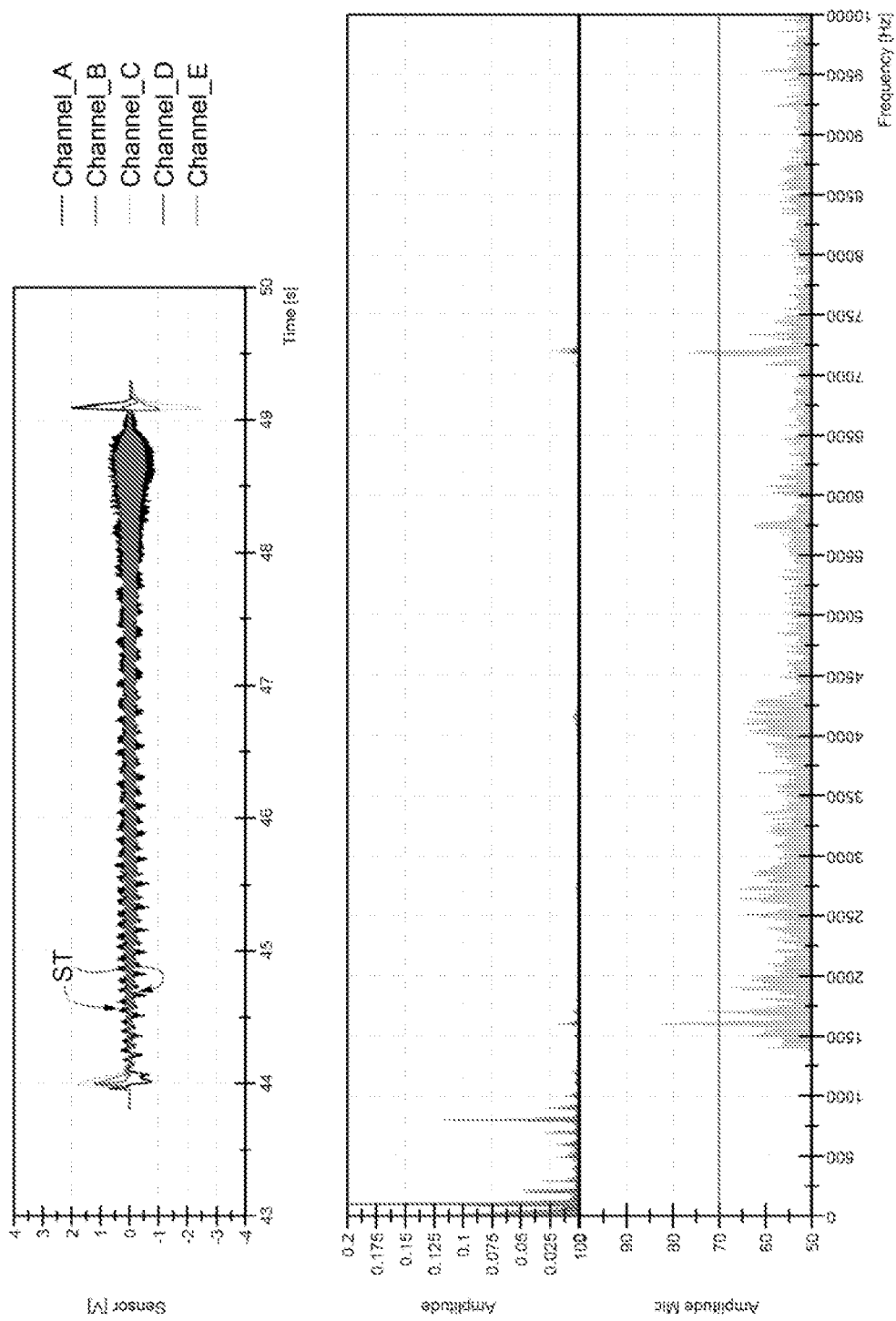

The graphs in the middle part of FIGS. 4 and 7 correspond to the results obtained by the ST signal processing generated during the bench testing of a brake pad 1 and illustrated in the upper part of the same figures by means of an FFT; the graphs in the middle part of FIGS. 4 and 7 both show peaks at specific frequencies. For comparison the lower part of the same FIGS. 4 and 7 give the graphs from the bench results obtained during the same test using sophisticated microphone-based equipment known in the art, which illustrates the frequencies and intensity of the noisiness generated in use by the brake pad 1.

Surprisingly, the graphs obtained using an FFT to process the equal length of time ST signal samples obtained, based on the critical parameters (sampling frequency) indicated above, have the same trend as the noisiness graphs obtained by means of microphone-based equipment; which graphs exhibit signal peaks at exactly the same frequency and that therefore correspond to the generation of noisiness at that frequency, noisiness whose intensity is proportional to the height of the peak. This result has proved to be reproducible with absolute precision under all test conditions. Furthermore, since the signals are generated by each separate sensor 15b, 15c, each associated with a specific channel, it is also possible to detect which physical point on the brake pad 1 generates the noisiness detected, something which is impossible to do using the commonly used microphone-based equipment and that costs much more than the device 100 equipped with sensorized brake pads 1 on each wheel of the vehicle, as according to the invention.

Figure 8:
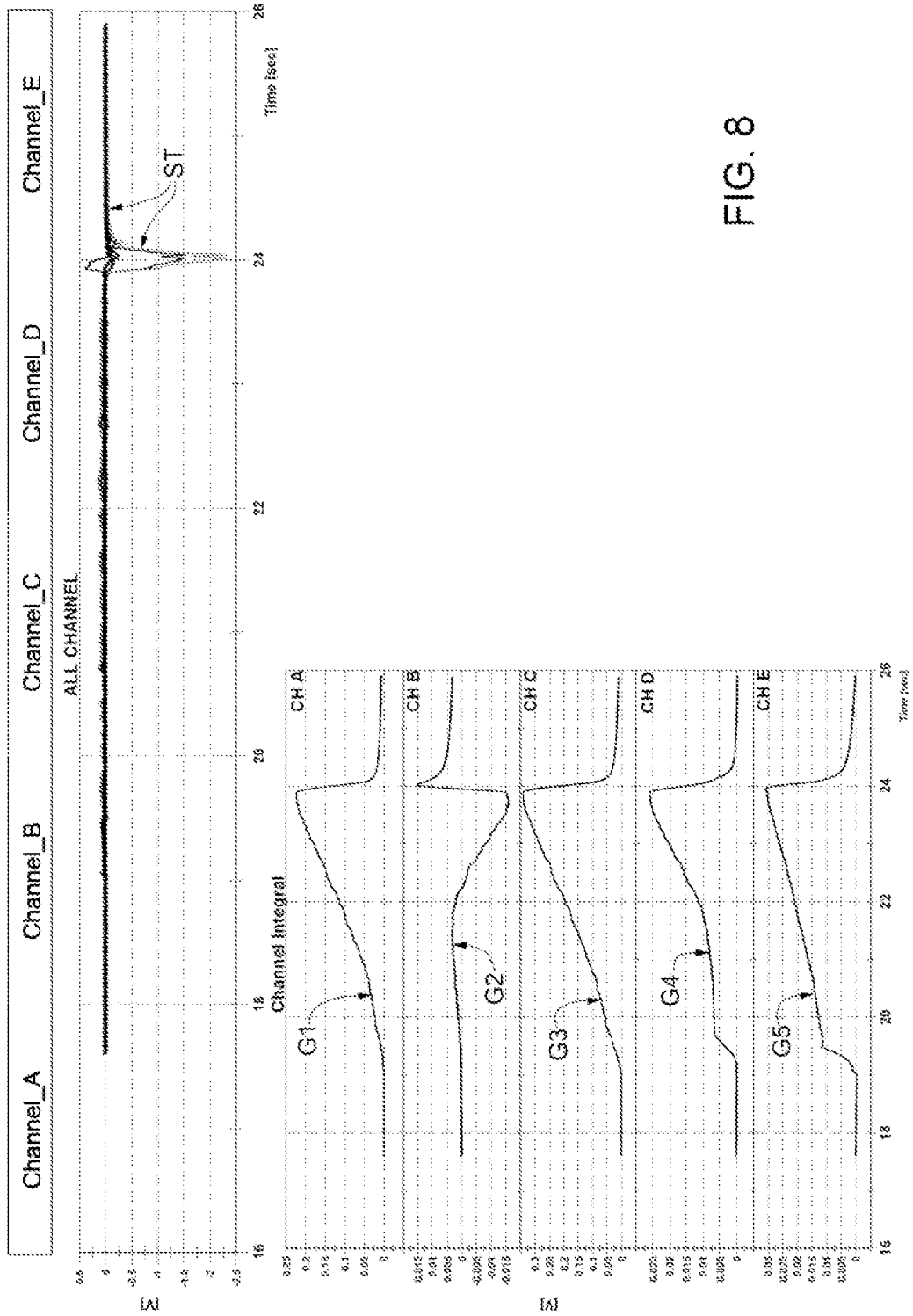

Finally, with reference to FIG. 8, at the bottom on the left of FIG. 8 there are the graphs obtained by integrating the entire ST signal given in the upper section of the same figure and shown separately for each channel. The sawtooth waveforms in graphs G1-G5 qualitatively correspond to the distribution of the pressure applied locally to the brake pad 1 corresponding to the sensors 15b, 15c resulting from the contact with the disc 3. The channel B graph, corresponding to the integration of the entire set of the equal length of time ST signal samples from sensor 15c, is inverted since it corresponds to the application of a tangential load (pressure), which "stretches" the sensor 15c, instead of compressing it, as is the case for the sensors 15b.

On the basis of what has been described insofar, it can be deduced that the second step of the method of the invention is carried out by separately picking up for each first sensor 15b and second sensor 15c, by means of the circuit 18, the relative electrical ST voltage signal generated by each sensor, and that the third step of the method of the invention is carried out in real time by processing the electrical ST voltage signal generated by each first and second piezoceramic sensor 15b, 15c in order to obtain equal length of time ST signal samples generated separately for each sensor, preferably such as to read a plurality of digital values at a rate of at least 40,000 values per second; while the fourth step of the method of the invention is performed by applying to each equal length of time ST signal sample obtained from each sensor 15b, 15c, an algorithm selected from the group of algorithms listed above in order to identify a specific physical quantity of interest.

The method of the invention also includes a fifth step for each first sensor 15b regarding the processing of a curve (curves C1-C2 of FIG. 3) which represents the residual torque trend locally present in use within the brake element 1. Said fifth processing step is performed in real time and involves the application to each equal length of time ST signal sample obtained from each piezoceramic sensor 15b of an algorithm consisting of an integration sequence of the voltage values read from each sensor, each integration being performed within an interval of time in the order of milliseconds.

The method of the invention also includes, in addition or as an alternative to the previous fifth step, a sixth step of processing for each first 15b and second piezoceramic sensor 15c a signal voltage vs. frequency (those shown by the graphs in the middle part of FIGS. 4 and 7), wherein the presence of a peak at a given frequency represents the generation between the brake element 1 and the element to be braked 3 of noisiness having the same frequency, and an intensity that is proportional to the amplitude of the voltage signal; said sixth step being carried out through the application in real time of an algorithm, consisting of an FFT (Fast Fourier Transform), to each of the equal length of time ST signal samples obtained from each piezoceramic sensor.

Finally, the method according to the invention also includes, in addition or as an alternative to the previous fifth and sixth steps, the seventh step of processing for each sensor a curve representing, during an interval of time equal to the execution of a full braking operation, the trend of the local contact pressures between the brake element and the element to be braked for each first sensor 15b and the tangential force applied between the brake element 1 and the element 3 to be braked for at least the second sensor 15c; said seventh step being carried out by applying an algorithm in real time that calculates the comprehensive integral of each equal length of time ST signal sample obtained from each piezoceramic sensor 15b, 15c.

According to a further aspect of the invention, the method of the invention also includes the step of calculating the friction coefficient value μ between the brake element 1 and element 3 to be braked during a braking event by calculating the ratio between the integral of the ST voltage data read by at least the second sensor 15c and the integral of the ST voltage data read by at least one of the first sensors 15b, by applying to the invention the known relationship $$\mu = FT/FN \tag{1}$$

According to another aspect of the invention, the method of the invention also includes a step of arranging a temperature sensor 21, connected to the electrical circuit 18, upon the first surface 13 between the block 14 of friction material and the metallic support element 11 which surface 13 is completely embedded within the block 14 of friction material; and the step of correcting the ST signal voltage values obtained from the piezoceramic sensors 15b, 15c as a function of the temperature detected by the temperature sensor, according to an empirical relationship known in advance and that can be stored by the processing means 122.

Similarly, the method of the invention may comprise:

a calibration step, wherein a selected type of brake element 1 equipped with at least one piezoceramic sensor 15 is subjected to a bench test wherein, by means of measurement equipment external to the brake element 1, known in the art and not illustrated for simplicity sake, at least one brake element operating parameter is measured, selected from a group consisting of: the contact pressure between a brake element and an element to be braked, the friction coefficient between a brake element and an element to be braked and the residual torque; and wherein the measured operating parameter is correlated with the processing result as according to the fourth step previously described and with the result of the correlation being parameterized in a table; and a calculation step wherein the processing result according to the fourth step previously described is compared with the table, suitably stored by storage means 123 connected to the electrical circuit 18 (integrated for example within the processing unit 122, FIG. 1) and the instantaneous brake element 1 operating parameter value is supplied in real time when in use during each braking operation.

In practice, by means of said processing step the control unit 10 of the vehicle can be able to recognize in use, second by second, the values and distribution of the pressures and shear stress applied to the brake pad 1 by the disc 3 during braking, the value for the instantaneous coefficient of friction and the magnitude, frequency and location of any noisiness generated during braking. The control unit 10 will then be in a position suitable to intervene in real time, for example, upon the actuator means 5, to correct any braking anomaly and to optimize said braking as a function of the driving conditions of the vehicle, as monitored by other on-board systems, which can be placed in direct communication with each other and with the device 100 described for example by means of the CAN bus of the vehicle itself.

Finally, the method according to the invention also allows for the indirect detection of the brake element wear by means of the same piezoceramic sensors 15b, 15c described above. To this end, the method of the invention comprises a prolonged (over time) comparative step of processing the electrical ST signal from at least one piezoceramic sensor 15b which is performed in order to identify a time-based decay function associated with the e.g. linear relationship between the ST electrical signal and the pressure exerted at said sensor (detectable for example by the hydraulic circuit 8, or directly by the control unit 10) during all steps of the vehicle braking, and the step of comparing the instantaneous decay function value with a threshold value, below which the wear signalling means 29 of the brake element 1 is activated.

Figure 5:
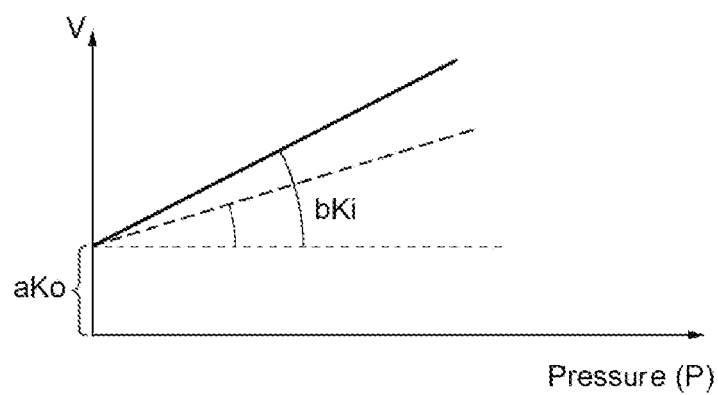
FIG. 5 illustrates an example diagram regarding a calculation methodology according to the method of the invention.

In other words, it exploits the relationship illustrated in FIG. 5, which represents the application of the following formulas:

$$Ki = Ki(W,T,t) \tag{2}$$

$$V = a\, K0 + b\, Ki*p \tag{3}$$

where V=the ST output signal magnitude (in volts), K0=the initial pad 1/disc 3 braking system stiffness, Ki=the braking system stiffness at time "i", P=applied pressure, W=brake pad wear T=temperature and t=time.

As a function of the pressure applied by the brake system, a brake system with greater stiffness will produce a greater response, and therefore a higher ST voltage signal.

In conclusion, according to the method and the device of the invention it is possible to assess in a quantitative and qualitative manner, the residual torque, the wear and the noisiness and vibration intensity coming from the braking system.

The purposes of the invention are thus fully achieved.

The invention claimed is:

1. A method for the real time estimation of an applied pressure and noisiness in a brake element, the method comprising the steps of:
    i) providing at least one first piezoceramic sensor and at least one second piezoceramic sensor between a friction material block and a metallic support element of the brake element, each of the first and second piezoceramic sensors being connected to an electric circuit;
    ii) with the brake element in use and by means of the electric circuit, picking up a respective electric voltage signal (ST) generated by at least one of the first and second piezoceramic sensors in response to the application of a mechanical stress on the at least one piezoceramic sensor;
    iii) processing the electric voltage signal (ST) by taking equal length of time samples of the electric voltage signal; and
    iv) processing each said equal length of time samples of the electric voltage signal by applying an algorithm selected from at least one of the group consisting of:
    a sequence of integrations of the voltage values present in the sample, each integration being carried out in an interval of time in the order of milliseconds; an FFT (Fast Fourier Transform) of the voltage values present in the sample; or an integral of the voltage values in the sample generated by the at least one piezoceramic sensor.

2. The method according to claim 1, wherein the electric voltage signal processing step is performed so as to collect a plurality of digital values using a sampling frequency equal to or higher than two times a targeted highest frequency contained in the electric voltage signal (ST).

3. The method according to claim 2, wherein the sampling frequency is at least 40 kHz.

4. The method according to claim 1, further comprising:
    arranging a plurality of the first piezoceramic sensors on a first surface of the metallic support element of the brake element, between the friction material block and the metallic support element, the plurality of first piezoceramic sensors being arranged spaced apart from one another so as to occupy the entire first surface of the metallic support element; and also arranging the at least one second piezoceramic sensor on the first surface, spaced apart from the plurality of first piezoceramic sensors; wherein step ii) is performed by separately picking up, by means of said electric circuit, a respective electric voltage signal (ST) generated by each first and second piezoceramic sensor; wherein step iii) is performed by processing in real time the electric voltage signal (ST) generated by each first and second piezoceramic sensor so as to generate separately, per unit of time, equal length of time samples of the signals for each piezoceramic sensor; and step iv) is performed by applying to each sample of said equal length of time samples of said signals obtained by means of each piezoceramic sensor, an algorithm chosen from at least one of the group consisting of: a sequence of integrations of voltage values detected for each piezoceramic sensor, each integration being carried out in an interval of time in the order of milliseconds; an FFT (Fast Fourier Transform) of each equal length of time sample of said signals generated by each piezoceramic sensor or; an integral of the equal length of time samples of said signals generated by each piezoceramic sensor.

5. The method according to claim 4, wherein the plurality of first piezoceramic sensors are biased in a direction perpendicular to the first surface, while the at least one second piezoceramic sensor is biased in a direction parallel to the first surface, such that the plurality of first piezoceramic sensors are adapted to generate the electric voltage signal (ST) in response to the application of stresses parallel to a direction of application in use of an actuating pressure on the brake element, while the at least one second piezoceramic sensor is adapted to generate the electric voltage signal (ST) in response to the application of stresses transverse to a direction of application in use of the actuating pressure on the brake element.

6. The method according to claim 5, wherein each of the first and second piezoceramic sensors are provided with electric signal connections to the electric circuit carried by opposite first faces of a piezoceramic block belonging to each piezoceramic sensor arranged parallel to the first surface of the metallic support element.

7. The method according to claim 4, further comprising the step of processing a curve (C1-C2) for each of the plurality of the first piezoceramic sensors, wherein the curve represents the residual torque trend locally present in use on the brake element, said processing step being performed by applying an algorithm in real time to each equal length of time sample of the signals obtained by means of each piezoceramic sensor consisting in an integration sequence of the detected voltage values by each piezoceramic sensor, each integration being in an interval of time in the order of milliseconds.

8. The method according to claim 4, further comprising the step of processing a signal voltage vs. frequency for each first and second piezoceramic sensor, in which signal the presence of a peak at a determined frequency represents the generation of a noise between the brake element and an element to be braked having the same frequency and intensity proportional to the amplitude of the voltage signal, said step being performed by applying an algorithm consisting of an FFT (Fast Fourier Transform) of the equal length of time samples of said signals made in real time on each equal length of time samples of the signals obtained by means of each piezoceramic sensor.

9. The method according to claim 4, further comprising the step of processing a curve (G1-G5) for each piezoceramic sensor which represents the trend of local contact pressures between the brake element and an element to be braked during the interval of time equal to the execution of a complete braking operation for each of the plurality of first piezoceramic sensors and of the tangential force applied between the brake element and element to be braked for the at least one second piezoceramic sensor, the step being performed by applying an algorithm consisting in running the overall integral of the equal length of time samples of said signals in real time on each equal length of time sample of the signals obtained by means of each piezoceramic sensor.

10. The method according to claim 4, further comprising the step of processing the friction coefficient value present between the brake element and an element to be braked during a braking operation by calculating the ratio between the integral of the value of the voltage data (ST) detected by the at least one second piezoceramic sensor and the value of the integral of the voltage data detected by at least one of the plurality of first piezoceramic sensors.

11. The method according to claim 1, further comprising:
arranging a temperature sensor connected to the electric circuit; and
adjusting the values of the voltage signals obtained from the at least one of the first and second piezoceramic sensors on the basis of the temperature detected by the temperature sensor.

12. The method according to claim 1, further comprising a calibrating step, in which a selected type of brake element provided with the at least one first piezoceramic sensor and at least one second piezoceramic sensor is subjected to a bench test in which at least one operating parameter of the brake element is measured by means of measuring means external to the brake element, the parameter being chosen from at least one of the group consisting of: contact pressure between the brake element and an element to be braked, a friction coefficient between the brake element and an element to be braked, or residual torque; and wherein the measured operating parameter is correlated with the result of the processing according to step iv) and the result of the correlation is parameterized in a table; the method further comprising:
calculating, in which the result of the processing according to step iv) is compared with the table, appropriately stored in storage means connected to said electric circuit and in which the instantaneous value of said operating parameter of the brake element when in use during each braking operation is supplied in real time.

13. A method according to claim 1, further comprising:
comparatively processing over time the electric voltage signal (ST) from the at least one first piezoceramic sensor and the at least one second piezoceramic sensor so as to identify a decay function over time of a linear ratio between the electric signal of the at least one piezoceramic sensor and the pressure exerted at the at least one piezoceramic sensor during the step of braking of the vehicle; and
comparing an instantaneous value of the processed decay function with a threshold value, below which wear signaling means of the brake element are activated.

14. A method according to claim 1, wherein each piezoceramic sensor has a response time equal to or less than 25 microseconds.

15. A method according to claim 1, wherein the braking element is a brake pad.

16. A method according to claim 1, in which each of the first and second piezoceramic sensors are completely imbedded within the block of friction material.

17. A device for the real time estimation of an applied pressure and noisiness in a brake element, the device comprising:
  i) at least one first piezoceramic sensor and at least one second piezoceramic sensor arranged between a friction material block and a metallic support element of the brake element, the at least one first piezoceramic sensor and the at least one second piezoceramic sensor being connected to an electric circuit;
  ii) wherein respective electric voltage signals (ST) generated by at least one of said first and second piezoceramic sensors are picked by the electric circuit in response to the application of a mechanical stress consequent to a contact between the brake element and an element to be braked;
  iii) a processor configured to process the electric voltage signal generated by the at least one piezoceramic sensor so as to generate equal length of time samples of the electric voltage signals;
  iv) and in which the processor is further configured to process each equal length of time samples of the electric signals generated by the at least one piezoceramic sensor in real time by applying an algorithm to the equal length of time samples of the electric signals chosen from at least one of the group consisting of: a sequence of integrations of the voltage values present in the equal length of time samples of the electric signals each carried out in an interval of time in the order of milliseconds; a FFT (Fast Fourier Transform) of the equal length of time samples of the electric signals; or an integral of the equal length of time samples of the electric signals generated by the at least one piezoceramic sensor.

18. A device according to claim 17, wherein a plurality of the first piezoceramic sensors and the at least one second piezoceramic sensor are arranged on a first surface of the metallic support element, the plurality of first piezoceramic sensors being arranged spaced apart from one another so as to occupy in discrete manner the entire first surface of the metallic support element covered by a friction material block, and the at least one second piezoceramic sensor being arranged spaced apart from the plurality of first piezoceramic sensors; the electric circuit being arranged on the metallic support element of the brake element and the plurality of first piezoceramic sensors being polarized in a direction perpendicular to a first surface, while the at least one second piezoceramic sensor is polarized in a direction parallel to the first surface, so that the plurality of first piezoceramic sensors are adapted to generate said voltage signals in response to the application of stresses parallel to a direction of application in use of an actuating pressure on the brake element, while the at least one second piezoceramic sensor is adapted to generate the voltage signal in response to the application of stresses transverse to a direction of application in use of the actuating pressure on the brake element.

19. A device according to claim 17, wherein the braking element is a brake pad.

20. A device according to claim 17, in which each of the first and second piezoceramic sensors are imbedded within the block of friction material.

* * * * *